United States Patent Office 3,498,955
Patented Mar. 3, 1970

3,498,955
NEUTRALIZATION OF POLYMERIZATION
SOLUTIONS OF AROMATIC POLYAMIDES
Herbert S. Morgan, Apex, and James O. Weiss, Raleigh, N.C., assignors to Monsanto Company, St. Louis, Mo., a corporation of Delaware
No Drawing. Filed July 6, 1967, Ser. No. 651,361
Int. Cl. C08g 20/38
U.S. Cl. 260—78    4 Claims

ABSTRACT OF THE DISCLOSURE

Neutralization of aromatic polyamide polymerization solutions is improved by the addition of anhydrous calcium or magnesium carbonate to the aromatic diamine solution prior to the addition of the aromatic diacid chloride and then neutralizing the solution by heating after polymerization is complete. The clear stable polymerization solution thus formed can be used for spinning immediately without the need of special filtration techniques.

BACKGROUND OF THE INVENTION

Wholly aromatic polyamides composed entirely of aromatic rings united by carbonamide groups

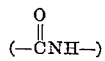

are well known. Such polymers are highly desirable because of their excellent thermal stability and good resistance toward other degradative conditions. These polymers may be prepared by the reaction of an aromatic diamine with an aromatic diacid halide, using either interfacial or solution techniques. A solution method is preferable because it eliminates the necessity for isolation, washing, drying and dissolution of the polymer.

A preferred method for the preparation of these polymer compositions is by means of a low temperature polyamidation reaction in a lower alkylamide solvent, such as dimethylacetamide. The presence of an acid acceptor is usually required to neutralize the acidic byproducts formed during the polymerization reaction, although in some instances the solvent can partially act as its own acceptor. Neutralizers such as calcium, lithium and sodium hydroxide, calcium oxide, sodium and calcium carbonate, and certain organic bases such as triethylamine and N-ethyl morpholine have been used for this purpose. If added to the reaction mixture prior to the addition of the acid chloride, or during the polymerization the water formed by the reaction of the neutralizer with the HCl formed, if present in even small amounts causes hydrolysis of the diacid chloride. This, in turn, causes an imbalance in stoichiometry resulting in the formation of low molecular weight polymers. Because of this, neutralizers are generally added to the polymer solutions subsequent to completion of the polymerization reaction. Due to the high viscosity of the polymer solutions, it is very difficult to form a homogeneous slurry of the solid neutralizer in the polymer solution without the formation of gel particles. Gel particles probably result from the formation of water on the surface of the solid neutralizer particles. The localized water causes precipitation of the polymer, which acts as a nucleating agent for gel particles.

It has now been found that these problems can be overcome and the polymerization process improved by the addition of anhydrous calcium or magnesium carbonate to the diamine solution prior to the addition of the diacid halide. These reagents tend to act as dehydrating agents, removing traces of water from the diamine solution, prior to the polymerization and making possible the preparation of higher molecular weight polymers. In addition, the neutralization takes place without gel formation and, as a result of the neutralization process inorganic salts and water are formed which aid in the solubilization and stabilization of the polymer solution.

SUMMARY OF THE INVENTION

This invention is concerned with an improved method for neutralization and removal of byproducts in the preparation of aromatic polyamides from aromatic diamines and aromatic diacid halides.

In the general procedure used heretofore for the preparation of polymers of this type, an aromatic diamine is reacted with an aromatic diacid chloride in a solvent for the polyamide. The reaction produces hydrogen chloride, which, because of its corrosive nature, requires the addition of neutralizers to the polymer solution, before spinning. Any insoluble material formed during the neutralization is separated, and fibers are then produced by known spinning methods.

Certain disadvantages are inherent in the above process, as generally practiced, when using commonly known neutralization reagents. One problem is that most neutralizers are solids and are difficult to disperse in thick viscous dopes, even as a finely divided powder, without the formation of localized gel structures. Another problem is that when some neutralizers are used, insoluble salts are formed, which must be removed by filtration before spinning. If, on the other hand, neutralizers are added, in the normal manner, prior to or during the polymerization reaction, water of neutralization will be formed, which will react with the acid halide and lower the polymer molecular weight and also form gels.

An improved method has now been found for carrying out this type of polymerization which overcomes the difficulties described above. The process consists of the addition of anhydrous calcium or magnesium carbonate to the cold diamine solution, prior to the addition of the diacid halide, carrying out the polymerization reaction in the normal manner, and subsequently effecting the neutralization reaction by warming the mixture. Surprisingly, anhydrous calcium and magnesium carbonates are uniquely suitable for use in the neutralization of the acidic corrosive byproducts, such as hydrogen chloride, formed in these polymerization reactions. Since both are weak bases, they do not react with the diamine or solvent, nor do they react with the hydrogen chloride formed during the course of the polymerization reaction. The neutralization reaction between the carbonate and hydrogen chloride begins only on heating after the polymerization is complete. The intermediate carbonic acid or salt and water formed during the reaction assist in the solubilization and stabilization of the polymer solution.

The major advantage of the polymerization process of this invention over that commonly used is that it makes possible the preparation of high molecular weight, stable, wholly aromatic polyamide solutions, which can be spun directly into fibers.

Accordingly, it is an object of this invention to provide a process for the preparation of high molecular weight wholly aromatic polyamide solutions.

Another object of this invention is to provide a method for the neutralization and stabilization of these polymer solutions which eliminates the possibility of local gel formation.

Still another object of this invention is to provide a method for the preparation of high molecular weight polymer solutions that can be spun directly into fibers without further processing.

Other objects will become apparent from a description of the invention.

Detailed description and preferred embodiments

This invention relates to an improved process for the preparation of wholly aromatic polyamides by the reaction of an aromatic diamine with an aromatic diacid chloride in a solvent for the polymer. In particular, the invention relates to an improved process for the neutralization of these polymer solutions.

Typical of polymers which may be prepared by the process of this invention are those wholly aromatic polyamides which may be characterized by the recurring structural unit

wherein $Ar_1$ and $Ar_2$ are divalent aromatic ring nuclei in which the chain extending bonds connecting $Ar_1$ and $Ar_2$ to nitrogen atoms and carbonyl groups respectively are attached to non-adjacent carbon atoms and where the

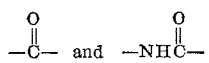

groups are attached to the $Ar_1$ and $Ar_2$ radicals through carbon atoms of carbocyclic rings. The term "aromatic ring" as used herein is intended to refer to any "aromatic ring system" which is of the carbocyclic or heterocyclic type. The term aromatic rings refers to single, multiple and fused ring residues, such as phenylene, biphenylene and naphthalene. This term is also used here to apply to aromatic ring systems which have been modified by internal aromatic amide block units. $Ar_1$ and $Ar_2$ may be the same or different and may be an unsubstituted divalent aromatic radical or a substituted divalent radical; the substituents being attached to the rings being chosen from nitro, halogen, lower alkyl groups and the like. In the above formula either one or both of the Ar groups may contain optionally linkages other than carbon-carbon such as for example

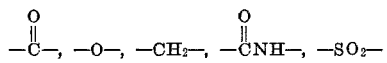

and the like.

The aromatic diamine and aromatic diacid halides referred to herein are those used to prepare the well known classes of aromatic polyamides. Examples of such diamines and diacid halides and the resulting polymers may be found in numerous patents and publications such as U.S. Patents 3,006,899; 3,063,966; 3,232,910 and 3,240,760.

A preferred method for the preparation of these polymer compositions is by means of the reaction of an aromatic diamine with an aromatic diacid halide in a lower alkylamide solvent. A preferred solvent for carrying out the polymerization is dimethylacetamide.

It is generally well known that the reactants and diluents used in the preparation of these polymers must be highly purified and free of water in order to obtain high molecular weight polymers. The amount of water present in the system should be maintained at or preferably below about 0.02% during the polymerization. For the purpose of excluding moisture, the reaction sohuld be carried out under an inert atmosphere such as nitrogen.

Because of its corrosive nature, the hydrogen chloride formed in the reaction is generally neutralized prior to spinning. In procedures described in the prior art, neutralization is accomplished by the addition of hydroxides or carbonates or the alkali or alkaline earth metals to the mixture after completion of the polymerization reaction. Neutralizers useful in the practice of this invention are restricted to calcium and magnesium carbonates, two reagents that have been used for this purpose previously, although not in the manner described in this invention. Other commonly employed neutralizers, such as lithium hydroxide, calcium hydroxide, sodium hydroxide, sodium carbonate, lithium carbonate and organic acid acceptors are not satisfactory for use in this invention.

A critical requisite of the present invention requires the addition of the specified neutralizer to the cold diamine solution, prior to the addition of the diacid halide. A particular advantage of the addition of the neutralizer at this point in the process lies in the fact that anhydrous calcium and magnesium carbonate are strong dehydrating agents. Not only will they remove the last traces of moisture and other like impurities from dry dimethylacetamide; but they will also maintain the system in an essentially anhydrous state during the polymerization reaction. The difficulties of removing the last trace amounts of moisture from hygroscopic solvents, such as dimethylacetamide, and maintaining them in the anhydrous state are well known. In order to obtain high molecular weight polymer, it is essential that the system be kept completely anhydrous.

Lithium, calcium and other hydroxides cannot be added at this point because they will react with the HCl generated during polymerization. The water thus formed will react with the diacid halide, causing a reduction of polymer molecular weight. In addition, strong bases, such as hydroxides, can also react directly with the diacid halide in competition with the diamine present, with the same result. Sodium carbonate, if present during the polymerization, will also react with the HCl, although to a lesser extent but with the same result. In addition, sodium carbonate is unsatisfactory since the sodium chloride formed on neutralization precipitates and must be filtered out, whereas calcium chloride is soluble, it does not precipitate and also acts as a solubilizing agent.

Lithium, calcium and sodium hydroxides have been used, in prior art procedures, to neutralize acid dopes of these polymers. These reagents are usually added to the stirred polymer solution in the form of finely divided powders or a slurry in solvent subsequent to the completion of the polymerization. Due to the high viscosity of the polymer dope, it is very difficult to form a homogeneous slurry of the solid neutralizer in the polymer solution without particle agglomeration and gel formation occurring. One possible explanation of the cause of gel formation and dope instability may be as follows: Water formed at the surface of the particle during neutralization causes localized precipitation of the polymer. The polymer coated particles as well as the solid hydrated neutralizer particles may act as nucleating agents for gel formation. It has been found that $CaCO_3$ and $MgCO_3$ react in the same way as LiOH and $Ca(OH)_2$ when added as finely divided powders subsequent to polymerization.

Organic neutralizers such as triethylamine, pyridine or diethylaniline also form insoluble salts with HCl which are difficult to remove from the highly viscous solution after polymerization. In addition, traces of organic neutralizers are carried over into the fibers and may cause coloration during further processing. Only calcium and magnesium carbonate have been found to be capable of the latent neutralization process.

In the operation of the process of the present invention, the anhydrous calcium or magnesium carbonate is added to a solution of an aromatic diamine to form a slurry which is then cooled to about 10° C. to −30° C. The stoichiometric amount of diacid chloride, in solid form, is then added to the diamine solution, with stirring, as rapidly as possible but without permitting the temperature to exceed 10°–20° C. As a result of the polymerization reaction some heat is generated and the reaction mixture usually rises to a temperature of from about 10°–20° C. As soon as the polymer reaches the desired degree of polymerization, the mixture is heated to start the neutralization reaction. Calcium carbonate begins to react with the HCl between about 40° C. and 90° C., forming carbonic acid, calcium chloride and water. The carbon dioxide immediately evolves as a gas and the calcium chloride dissolves in the polymer solution. This salt acts as a solubilizing agent to keep the polymer in solution, for further processing to fibers, films and the like. The water formed is also beneficial in that it stabilizes the polymer, salt, solvent mixture against gellation.

In a preferred embodiment of the invention 90–100 percent of the equivalent amount of anhydrous calcium carbonate, based on the calculated amount of HCl possible, is added to a solution of an aromatic diamine in dimethylacetamide which has been cooled to −20° C. The use of even a very small excess (about one percent) of calcium carbonate produces hazy dopes, and is to be avoided; whereas, less than 90 percent of theory produces a dope with higher acidity than can be tolerated, subject to being heated, in stainless steel equipment. An amount equivalent to about 95–98% of the stoichiometric amount for complete neutralization is optimum in most cases. A small amount of unneutralized HCl is beneficial toward the stability of these polymer solutions. An equimolecular quantity of an aromatic diacid chloride is then added, and after completion of the polymerization, the mixture is slowly heated to about 80° C. for one hour to effect the neutralization reaction. The rate of neutralization can be easily controlled by the rate of heating and stirring such that a clear, stable, high molecular weight polymer solution is obtained, which can be spun without further processing. In the most desirable embodiment of this invention, both water and HCl are present in the neutralized dope, on completion of the process. The presence of these byproducts increases the stability of these polymer solutions, particularly with respect to heating.

Normally, a slight vacuum is applied the warm, neutralized dope, to assist in removing any dissolved $CO_2$ and air, prior to transfer of the dope to the spinning tank. Such deaeration of these polymer solutions is routinely done to improve spinnability.

The invention is further illustrated by the following examples in which all parts and percents are by weight unless otherwise indicated.

EXAMPLE I 10.39 grams (.03 mole) of N,N'-m-phenylenebis(m-amino-benzamide) is dissolved under nitrogen in 47 ml. of dimethylacetamide, 2.85–2.95 gms. (95–98%) of the stoichiometric amount of anhydrous calcium carbonate powder was added to form a slurry. The mixture was cooled with stirring to −20° C. and 6.09 gms. (.03 mole) of terephthaloyl chloride added, the last traces being washed in with 20 ml. of dimethylacetamide. After 20 minutes, the coolant bath was removed, and the stirred mixture allowed to come to room temperature. At this stage, the dope was opaque due to the insoluble calcium carbonate slurry and its pH was about 1.0 to 1.5. Two hours after removal of the coolant bath, the highly viscous dope was heated under nitrogen to 80–90° C. in a water bath for one hour with stirring. Gas bubbles ($CO_2$) formed in the dope and it gradually became clear and free of bubbles. A slight vacuum bleed was used to assist $CO_2$ removal as a finishing step. The dope was allowed to cool to room temperature. The pH of the neutralized dope was about 3.0 to 3.5 and the Brookfield viscosity 5,000 p. (17% polymer solids). The inherent viscosity of the dope was 2.0, which has been found to be entirely adequate for the production of fibers with good tensile properties and thermal stability.

EXAMPLE II (A) Use of calcium oxide neutralizer 15.60 grams (.045 mole) of N,N'-m-phenylenebis(m-aminobenzamide) was dissolved under nitrogen in 75 ml. of dimethylacetamide. 2.40 gms. (app. 95% of theory) of anhydrous calcium oxide powder was added to the solution to form a slurry. The slurry was cooled to −20° C. with stirring and 9.14 gms. (.040 mole) of terephthaloyl chloride added, using an additional 25 ml. of dimethylacetamide to wash in the last traces. After 20 minutes, the cooling bath was removed and the mixture allowed to come to room temperature with stirring. The mixture became clear but had a very low viscosity.

(B) Use of calcium carbonate in place of calcium oxide

The example above was repeated in exactly the same manner except that calcium carbonate was used in place of calcium oxide. The monomers and solvents used were from the same samples as Example II(A).

15.60 grams (.045 mole) of the diamine used in Example II(A) was dissolved in 75 ml. of dimethylacetamide, 4.28 gms. of anhydrous calcium carbonate added, and the slurry cooled to −20° C. 9.14 gms. (.040 mole) of the same sample of terephthaloyl chloride as used in Example II(A) was added. After 20 minutes, the cooling bath was removed and the mixture allowed to come to room temperature with stirring. After two hours, the highly viscous dope was heated under nitrogen to 80–90° C. in a water bath for one hour with stirring.

The clear viscous dope had an inherent viscosity of 2.1–2.2.

EXAMPLE III

The same diacid chloride, diamine and solvent were used in the experiments below. The apparatus and general procedure used in carrying out the polymerization was the same as described in Example I.

(A) Control run with no $CaCO_3$ 15.60 grams (.045 mole) of diamine was dissolved in 60 ml. of dry dimethylacetamide. The solution was cooled to −20° C. and 9.14 grams (.040 mole) of terephthaloyl chloride added at −20° C., using 40 ml. of dimethylacetamide to wash the last traces of acid chloride into the flask. After completion of the reaction, as described in Example I above, a cloudy dope was obtained which contained precipitate on cooling. Microscopic examination of the dope revealed the presence of gel particles. The inherent viscosity of the dopes was 1.88.

(B) Using N-ethyl morpholine as the neutralizer during the polymerization reaction 15.6 grams (.045 mole) of diamine was dissolved in 60 ml. of dry dimethylacetamide and cooled to −20° C. 10.37 gms. (.09 mole) of N-ethylmorpholine was then added, followed by the addition of 9.14 gms. (.040 mole) of terephthaloyl chloride, with 20 ml. of solvent. A vigorous reaction took place during the first minute but no further increase in viscosity was observed after stirring for 2 hours. The polymer solution was cloudy and contained gels. The inherent viscosity of this polymer was 1.11.

The N-ethyl morpholine used was purified by distillation and dried over 5A molecular sieves.

(C) Use of triethyl amine as neutralizer 15.60 grams (.045 mole) of diamine was dissolved in 60 ml. of dimethylacetamide and cooled to −20° C. 9.11 grams of triethylamine (dried over 5A molecular sieves) was added, followed by the addition of 9.14 grams (.040 mole) of terephthaloyl chloride with 20 ml. of dimethylacetamide. The usual rapid reaction did not occur. A cloudy, low viscosity polymer solution was obtained, which contained gels and had an inherent viscosity of 0.68.

(D) Using $CaCO_3$ as neutralizer, present during the polymerization 15.6 grams (.045 mole) of diamine was dissolved in 60 ml. of dry dimethylacetamide and cooled to −20° C., 4.28 gms. of anyhydrous calcium carbonate added, and then 9.14 gms. (.040 mole) of terephthaloyl chloride added to the stirred slurry, followed by 25 ml. of solvent. After stirring for 20 minutes, the reaction mixture was allowed to come to room temperature and then after 2 hours warmed to 80–90° C. A clear, viscous dope was obtained which had an inherent viscosity greater than 2.0.

EXAMPLE IV

Use of N-ethyl morpholine as the acid acceptor and calcium oxide as neutralizer. Used —40° C. and multiple addition of terephthaloyl chloride and neutralizer under slow reaction conditions in order to obtain a higher viscosity polymer solution.

15.60 grams (.045 mole) of diamine was dissolved in 55 ml. of dimethylacetamide, 10.37 gms. of N-ethyl morpholine added and the mixture cooled to —40° C. 4.219 gms. of terephthaloyl chloride was added, followed by 15 ml. of dimethylacetamide. After 15 minutes 4.92 gms. of terephthaloyl chloride was added followed by 15 ml. of dimethylacetamide. (Total acid chloride 9.14 gms. (.040 mole) at —32° C. the viscosity began to build up slightly but did not continue. The mixture was stirred for 3 hours and allowed to stand overnight. The dope was cloudy, and of low viscosity, 2.40 gms. of CaO was added and stirred in. After warming and cooling, the polymer solution was still cloudy. The inherent viscosity was 0.71.

EXAMPLE V

Use of CaO as neutralizer after completion of the reaction.

208.0 grams (.60 mole) of diamine was dissolved in 1200 ml. of dimethylacetamide and cooled to —20° C. 121.8 gms. (.60 mole) of terephthaloyl chloride was added followed by 100 ml. of solvent. After ½ hour, the stirred mixture was allowed to rise to room temperature and stirred for additional 2½ hours. 32 gms. CaO (95% theory) was added with 74 ml. of solvent, while cooling the mixture with a water bath. The temperature increased from 30° C. to 53° C. during neutralization. The polymer solution was only slightly hazy and had a B.V. of 5 M at 22° C., pH of polymer solution 3.0. The inherent viscosity of the polymer solution was 2.06.

The spinnability of the polymer solution was poor due to clogging of the filter and pressure build-up. The maximum cascade stretch was reduced from 2.5 to 1.58. Examination under the microscope revealed the presence of micro gel particles.

EXAMPLE VI

Using boron trioxide as neutralizer added before polymerization.

15.6 grams (.045 mole) of diamine was dissolved in 65 ml. of dimethylacetamide. 1.04 gms. of boron trioxide and 10 ml. of solvent was added and the solution cooled to —20° C. 9.14 gms. (.040 mole) of terephthaloyl chloride added followed by 25 ml. of solvent. After completion of the polymerization reaction in the normal manner, the viscous, cloudy polymer solution was heated to 70–80° C. The polymer solution became unstable and polymer precipitated. Cooled to 22° C., the B.V. was 3.6 M. The polymer solution had a pH <3.0 and an inherent viscosity of 1.99.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:

1. A process for the neutralization of aromatic polyamides consisting of the recurring structural unit

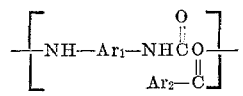

wherein $Ar_1$ and $Ar_2$ are aromatic radicals and where the

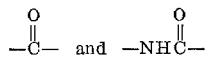

groups are attached to the $Ar_1$ and $Ar_2$ radicals through carbon atoms of carbocyclic rings comprising the steps of:

(1) adding substantially anhydrous calcium or magnesium carbonate to inert solvent solution of an aromatic diamine at a temperature of about 10° C. to 30° C. to form a slurry, said carbonate being present in an amount corresponding to 90 to 100 percent of the amount necessary to neutralize liberated hydrogen halide;

(2) mixing the slurry with an aromatic diacid halide forming a reaction mass and allowing polymerization to occur, while maintaining the temperature of said reaction mass below 20° C.;

(3) and then heating the reaction mass to a temperature of from about 40° C. to 90° C. causing neutralization to occur.

2. The process of claim 1 wherein $Ar_1$ is

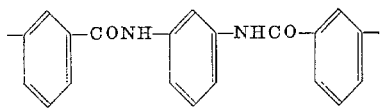

and $Ar_2$ is

3. The process of claim 1 wherein $Ar_1$ and $Ar_2$ are

4. A process for the neutralization of poly-m-phenylenebis(m-benzamido)terephthalamide comprising the steps of:

(1) adding substantially anhydrous calcium carbonate to a solution of m-phenylenebis(m-aminobenzamide) in dimethylacetamide at a temperature of about —20° C. to form a slurry, said carbonate being added in an amount corresponding to 90 to 100 percent of the amount necessary to neutralize the liberated hydrogen chloride;

(2) mixing the slurry with terephthaloyl chloride forming a reaction mass and allowing polymerization to occur, while maintaining the temperature of said reaction mass below 20° C.;

(3) and then heating the reaction mass to a temperature of from about 80–90° C. causing neutralization to occur.

References Cited

UNITED STATES PATENTS 3,094,511  6/1963  Hill et al. _____ 260—78
3,206,438  9/1965  Jamison _____ 260—78
3,354,125  11/1967 Smith et al. _____ 260—78

HAROLD D. ANDERSON, Primary Examiner

U.S. Cl. X.R.

260—96

UNITED STATES PATENT OFFICE
CERTIFICATE OF CORRECTION

Patent No. 3,498,955          Dated     March 3, 1970

Inventor(s)  Herbert S. Morgan and James O. Weiss

It is certified that error appears in the above-identified patent and that said Letters Patent are hereby corrected as shown below:

Column 3, line 62, "sohuld" should read --should--.
Column 5, line 32, "applied the warm" should read --applied to the warm--. Column 7, line 52, "chlorine added" should read --chlorine was added--. Column 8, line 15, Claim 1, "30° C." should read -- -30° C. --.

Signed and sealed this 26th day of October 1971.

(SEAL)
Attest:

EDWARD M. FLETCHER, JR.          ROBERT GOTTSCHALK
Attesting Officer                Acting Commissioner of Patents